United States Patent [19]

Ehrich et al.

[11] 3,873,548
[45] Mar. 25, 1975

[54] 2,9-DICARBOXYQUINACRIDONE AND METHODS FOR ITS PRODUCTION

[75] Inventors: Felix Frederick Ehrich, Mexico City, Mexico; Edward E. Jaffe, Union, N.J.

[73] Assignee: E. I. du Pont de Nemours and Company, Wilmington, Del.

[22] Filed: Mar. 7, 1973

[21] Appl. No.: 338,687

Related U.S. Application Data

[62] Division of Ser. No. 140,984, May 6, 1971, Pat. No. 3,752,817.

[52] U.S. Cl............................................. 260/279 R
[51] Int. Cl............................................. C07d 39/00
[58] Field of Search ............................... 260/279 R

[56] References Cited
UNITED STATES PATENTS

| | | | |
|---|---|---|---|
| 3,009,916 | 11/1961 | Struve | 260/279 R |
| 3,116,295 | 12/1963 | Zerweck | 260/279 R |
| 3,251,845 | 5/1966 | Jaffe | 260/279 R |
| 3,261,836 | 7/1966 | Chen | 260/279 R |
| 3,301,856 | 1/1967 | Higgins | 260/279 R |
| 3,386,843 | 6/1968 | Jaffe | 260/279 R |
| 3,475,436 | 10/1969 | Cooper | 260/279 R |
| 3,632,588 | 1/1972 | Ehrich | 260/279 R |
| 3,738,988 | 6/1973 | Jackson | 260/279 R |
| 3,741,970 | 6/1973 | Fuchs et al. | 260/279 R |
| 3,749,726 | 7/1973 | Fuchs | 260/279 R |

*Primary Examiner*—Donald G. Daus

[57] ABSTRACT

This invention relates to 2,9-dicarboxyquinacridone and to methods for its preparation.

2 Claims, No Drawings

2,9-DICARBOXYQUINACRIDONE AND METHODS FOR ITS PRODUCTION

BACKGROUND OF THE INVENTION

Quinacridone and quinacridone derivatives have found acceptance as pigments in a wide variety of applications. Although their physical properties are regarded as excellent for many uses, their lack of stability at high temperatures has been a handicap in certain areas. This is particularly so in the fabrication of colored plastic articles wherein there is a need for the pigment to withstand relatively high processing temperatures.

SUMMARY OF THE INVENTION

In accordance with the invention there is provided 2,9-dicarboxyquinacridone, a novel red-colored quinacridone derivative which is characterized by a high level of color stability in plastic extrusions at temperatures up to about 320°C.

2,9-Dicarboxyquinacridone has the following formula

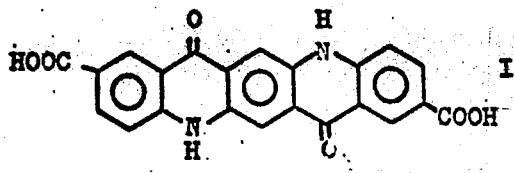

III and in a preferred embodiment of the invention is prepared by the steps of (1) reacting succinyl succinic acid ester with alkyl p-aminobenzoate, (2) cyclizing the product dialkyl 2,5-di-(4-carbalkoxyanilino)-3,6-dihydroterephthalate of formula

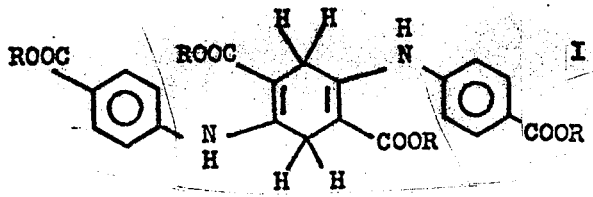

I to give a 2,9-dicarbalkoxy-6,13-dihydroquinacridone of formula

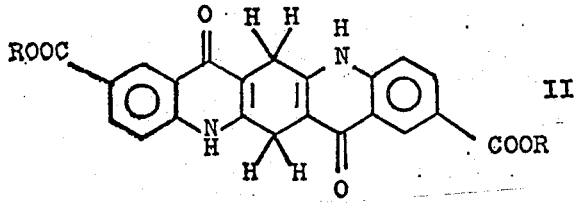

II and (3) hydrolyzing and oxidizing the compound II. In the above formulas R is suitably alkyl of 1–4 carbons.

The compound 2,9-dicarboxyquinacridone exhibits outstanding pigmentary properties, especially as regards color and heat stability, when incorporated in compositions such as plastics where the conditions required for fabrication of colored articles are quite severe. The novel red pigment of this invention is found to be especially color- and heatstable under the severe fabrication conditions required for production of plastic articles and particularly those comprising polyamides and polyester compositions. Plastic compositions employing the 2,9-dicarboxyquinacridone pigment of this invention are characterized by cleanness, brightness, and uniformity of color as well as by stability toward heat and light.

ALTERNATIVE PROCESS EMBODIMENTS

Examples 1, 2 and 3 illustrate three alternative routes for preparing 2,9-dicarboxyquinacridone. Parts and percentages in the examples are by weight unless otherwise indicated.

EXAMPLE 1

This synthesis is carried out as follows: one mole of an ester of dialkylsuccinylsuccinate is reacted with two moles of alkyl p-aminobenzoate using the eutectic mixture of biphenyl and diphenyl oxide (Dowtherm A) as a solvent and p-toluenesulfonic acid as a catalyst to produce dialkyl 2,5-di-(4-carbalkoxyanilino)-3,6-dihydroterephthalate I. This intermediate product is heated in boiling Dowtherm to effect cyclization to 2,9-dicarbalkoxy-6,13-dihydroquinacridone II. By oxidation and hydrolysis of the 2,9-dicarbalkoxy-6,13-dihydroquinacridone, the desired product, 2,9-dicarboxyquinacridone is obtained.

A. Preparation of dialkyl 2,5-di-(4-carbethoxyanilino)-3,6-dihydroterephthalate (where alkyl is methyl/ethyl)

To a one-liter flask equipped with an agitator and means for introducing nitrogen to maintain an inert atmosphere within the flask, are added the following:

34.8 grams (0.144 mole) of a mixture of the methyl and ethyl esters of succinyl succinic acid
52.4 grams (0.318 mole) of ethyl p-aminobenzoate
0.5 gram (0.0026 mole) of p-toluenesulfonic acid monohydrate
78 ml. Dowtherm The reaction mixture is subjected to a vacuum of about 15 mm. and is heated for six hours at 95°–100°C. At the conclusion of the heating period, the flask contents are brought to atmospheric pressure by allowing nitrogen to blanket the mixture, and cooled to 65°C.

To the flask and contents are then added 150 cc. methanol and the mixture stirred for 30 minutes, cooled to 25°C. and the precipitate filtered, washed with three portions of methanol of 150 cc. each, and air dried. The yield of product, based on the weights of reactant used is 94.6%.

B. Preparation of 2,9-dicarbalkoxy-6,13-dihydroquinacridone (II where R is methyl/ethyl)

Fifty and six-tenths grams of the mixture of dimethyl and diethyl 2,5-di-(4-carbethoxyanilino)-3,6-dihydroterephthalates as produced in A is reslurried in 202 cc. Dowtherm and heated to 145°C. to effect complete solution. The solution is transferred to an addition funnel, and held at 135°–145°C. under nitrogen. This solution is added over a period of 90 minutes to 202 cc. of well-agitated refluxing Dowtherm, also under a nitrogen atmosphere. After the addition is complete, the pyrolysis mixture is stirred for 30 minutes at reflux, cooled to 40°C., filtered, washed free of Dowtherm with methanol, and dried. The yield of II is 95.4% based on the ester terephthalate I used. Analysis gave the following results:

| Calculated for $C_{26}H_{22}N_2O_8$ | Found |
|---|---|
| C - 68.12% | 68.2% |
| H - 4.93% | 4.8% |
| N - 5.47% | 6.12% |

C. Preparation of 2,9-dicarboxyquinacridone in First Polymorphic Form

Two hundred fifty two grams of a press cake comprising 110.5 grams of II prepared as in B and 141.5 grams of methanol is stirred into 228 grams of methanol, and 236 grams of water is added. While keeping the temperature of the mixture below 40°C., a solution of 101.4 grams of potassium hydroxide in 124 grams of water is added. The mixture is stirred for one and one-quarter hours while maintaining the temperature at 25 to 40°C., thus forming the potassium salt of II. At the conclusion of this heating period, a solution of 54 grams of sodium m-nitrobenzene sulfonate in 72 grams of water is added with stirring. This solution is rinsed into the reaction mixture using 72 grams additional water. The mixture is heated and maintained at reflux for four hours to effect hydrolysis and oxidation of II. Then heating is discontinued and 200 grams of water is added bringing the temperature to 60°–65°C. Stirring is continued for 15 minutes and 148 grams of sodium chloride is added. By ion-exchange the potassium salt of II becomes the sodium salt which precipitates due to excess sodium chloride. After an additional 15 minutes of stirring (still at 60°–65°C.) the slurry is filtered, the precipitate washed with portions of 2% (volume basis) acetic acid until chloride-free thus forming the 2,9-dicarboxyquinacridone III. The yield is found to be 97% based on the weight of 2,9-dicarbalkoxy-6,13-dihydroquinacridone used.

The product exhibits an X-ray diffraction pattern characterized by one strong, one medium and five weak bands of the following interplanar spacings in Angstrom units: 16.05 (weak), 6.55 (medium), 6.10 (strong), 5.06 (weak), 4.11 (weak), 3.45 (weak), and 3.23 (weak).

D. Preparation of 2,9-Dicarboxyquinacridone in Second Polymorphic Form

The oxidation and hydrolysis of II is repeated through the step of refluxing the reaction mixture for 4 hours. The reaction mixture now containing the potassium salt of II and excess KOH, is cooled to 60°–65°C. and acetic acid added to effect neutralization of the excess hydroxide and acidification of the mixture to a pH of 4.6–4.8. The mixture is stirred for 15 minutes while maintaining the temperature at 60°–65°C., and the slurry filtered, the pigment washed until acid free, and dried. The second polymorphic form of 2,9-dicarboxyquinacridone thus obtained is characterized by an X-ray diffraction pattern of two strong, one medium, and four weak bands of the following interplanar spacings in Angstrom units: 17.66 (weak), 6.06 (strong), 5.75 (medium), 5.06 (weak), 4.23 (weak), 3.65 (weak), and 3.23 (strong).

This same polymorphic modification is alternatively obtained by dissolving 30 grams of 98% $H_2SO_4$ at 85°C. and drowning rapidly into an excess of water. The resulting slurry is boiled for three hours, filtered, washed acid- and sulfate-free and dried.

In this example it will be noted that part A involves a reaction carried out for six hours at a temperature of 95° to 100°C. in a Dowtherm medium, the product thereafter being washed with several portions of methanol. The purpose of this washing is to remove any excess p-aminobenzoate present with the precipitate. Although as described the methanol-wet cake in A was dried before further processing, it has been found that such drying step can be omitted and the methanolwet press cake diluted with Dowtherm and the resulting slurry heated to 145°C. while distilling off methanol. The solution of the ester, still containing some alcohol, is slowly added to boiling Dowtherm in order to effect the cyclization reaction. The presence of some methanol in the solution has no detrimental effect on the quality or yield of II.

EXAMPLE 2

This alternative method for the preparation of III is shown in the following series of reactions: dialkyl succinylsuccinate is reacted with p-aminobenzoic acid under acid catalysis to yield dialkyl-2,5-(4-carboxyanilino)-3,6-dihydroterephthalate:

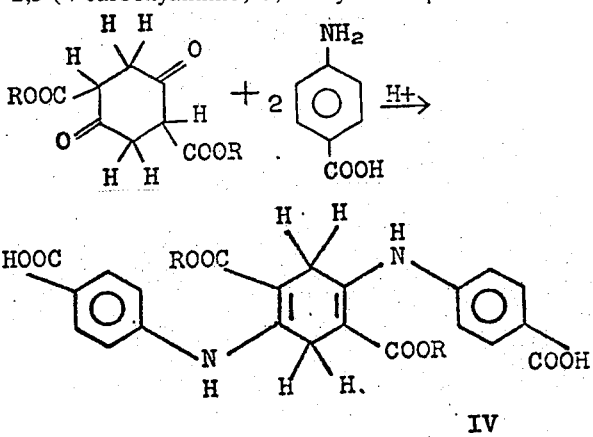

where R is methyl or ethyl

The compound IV is hydrolyzed and oxidized to yield

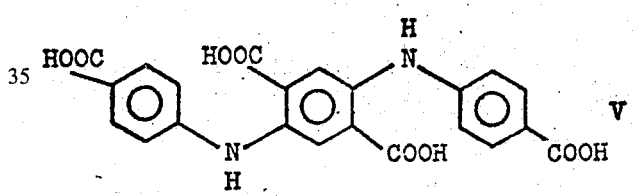

which is ring closed in polyphosphoric acid to yield III.

A. Preparation of diethyl-2,5-(4-carboxyanilino)-3,6-dihydroterephthalate.(diethyl IV)

The following mixture of ingredients is heated with stirring under reflux for three hours under an atmosphere of nitrogen:
   2.56 grams (0.01 mole) diethyl succinylsuccinate,
   100 ml absolute ethyl alcohol,
   4.1 grams (0.03 mole) p-aminobenzoic acid, and
   0.5 ml concentrated hydrochloric acid.

The pale yellowish product which precipitates in the course of the 3 hours heating period is filtered and washed with alcohol. The product, diethyl-2,5-(4-carboxyanilino)-3,6-dihydroterephthalate is obtained in 91.1% yield (4.5 grams).
Analysis shows the following:

| | |
|---|---|
| % N calculated for $C_{26}H_{26}N_2O_8$: | 5.66 |
| % N found: | 5.46 |

The melting point of the product is found to be 347°–350°C.

B. Preparation of 2,5-di(carboxyanilino)-terephthalic acid (V)

Fifty grams of the product of A is mixed with 500 grams ethanol, 50 grams sodium salt of m-nitrobenzene sulfonic acid, 30 grams of NaOH dissolved in 250 ml. $H_2O$ and then the mixture is heated under reflux for 4.5 hours. The mixture is cooled by addition of 2.5 liters $H_2O$ which dissolves the solid, the solution is clarified, and the filtrate acidified with hydrochloric acid. The precipitate (V) is washed with water until chloride-free. After drying, the yield is found to be 44.2 grams or 100% based on the starting material.

A small sample of the product V is recrystallized from a mixture of dimethylformamide and water. The recrystallized material is found not to melt up to 400°C. Elemental analysis of this recrystallized product is as follows:

| For a composition of $C_{22}H_{16}N_2O_8$: | |
|---|---|
| % Calculated | % Found |
| C - 60.5 | 59.74 |
| H - 3.17 | 3.94 |
| N - 6.42 | 6.90 |

C. Cyclization of V to 2,9-dicarboxyquinacridone (III)

To effect cyclization of V, 22.3 grams of V obtained as shown in B is introduced into 300 grams polyphosphoric acid and the mixture stirred and heated to 140°–150°C. The tetracarboxylic acid dissolves in the polyphosphoric acid on heating of the mixture, but as the cyclization progresses, a red product comes out of solution. The mixture is held at 140°–150°C. for three hours and then cooled. While keeping the temperature at about 50°C., 300 ml of water is added slowly to effect hydrolysis of the conjugate acid of the cyclized product. The product, a different shade of red than the conjugate acid, is filtered and washed acid free. The weight of the product III is 20.6 grams representing a 100% yield. Its X-ray pattern is identical to that of Example 1-C.

D. Purification of 2,9-dicarboxyquinacridone (III)

The crude product III prepared according to the process of C is purified by recrystallization as follows:

Forty grams of the crude product of C is dissolved at 8°–10°C. in 600 grams of 100% $H_2SO_4$. When solution is complete (as indicated by microscopic examination of the solution), the acid concentration is lowered to 90% by careful addition of a calculated amount of water, maintaining the temperature at about 10°C. The precipitated sulfate is filtered on a sintered funnel, washed with about 85% $H_2SO_4$ and decomposed with ice. The liberated 2,9-dicarboxyquinacridone is filtered and washed with water until free of acid. The yield is 32.3 grams. Its X-ray pattern is identical to that of Example 1-D.

For further purification, five grams of the recrystallized product is refluxed for 3 hours in 500 ml dimethyl-formamide, filtered, and washed with methanol. Four and one-half grams of purified product III is obtained. Analysis shows:

| Calculated for $C_{22}H_{12}N_2O_6$ | Found |
|---|---|
| N - 7.00% | 6.63% |

Infra-red analysis of this product shows the characteristic carboxyl/carbonyl absorption. Its X-ray pattern is the same as that exhibited by the pigment prior to dimethylformamide extraction.

E. Repeat of A to Prepare Mixed Ethyl Methyl Ester of 2,5-(4-carboxyanilino)-3,6-dihydroterephthalate (ethyl/methyl IV)

The following mixture of ingredients is heated with stirring at reflux under a nitrogen atmosphere for three hours:

51.2 grams (0.2 mole) ethyl-methyl succinyl succinate
2 liters methanol
82 grams (0.6 mole) p-aminobenzoic acid
3 ml. concentrated HCl At the conclusion of the heating time the flask is cooled and the contents filtered, washed with water until free of chloride and dried. The yield is 88.0 grams of the mixed ester of IV (thus 90.7%). Steps B and C may then be followed leading to the preparation of III.

EXAMPLE 3

In still anoather alternative method for preparation of III, the intermediate dialkyl 2,5-di-4-carboxyanilino-3,6-dihydroterephthalate IV, the preparation of which has been shown in Example 2, is cyclized in a high boiling solvent to 2,9-dicarboxy-6,13-dihydroquinacridone of formula VI:

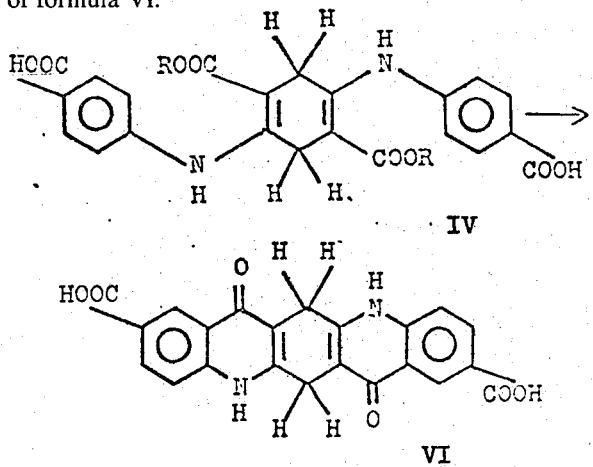

The desired compound 2,9-dicarboxyquinacridone III is obtained from VI by oxidation with sodium m-nitrobenzene sulfonate in alcoholic sodium hydroxide.

A. Preparation of 2,9-dicarboxy-6,13-dihydroquinacridone (VI)

Nine and one-half grams of diethyl-2,5-(4-carboxyanilino)-3,6-dihydroterephthalate is suspended in 250 ml. of Dowtherm and heated to 150°–160°C. while maintained under a nitrogen atmosphere. The thin slurry is added to 250 ml. of boiling Dowtherm over a period of 45 minutes. Reflux is continued for another two hours and the resulting slurry is cooled to 120°C., the solid isolated by filtration, and washed with methanol. The yield is 7.8 grams and the analysis is as follows:

| Calculated for $C_{22}H_{14}N_2O_6$: | Found |
|---|---|
| C - 65.6% | C - 64.2% |
| H - 3.48% | H - 3.9% |
| N - 6.96% | N - 6.4% |

B. Preparation of 2,9-dicarboxyquinacridone (III) from 2,9-dicarboxy-6,13-dihydroquinacridone VI For this preparation, 7.7 grams of VI prepared as in part A is added to a solution of 48 grams of methanol, 45 grams of water and 12 grams sodium hydroxide. After stirring this suspension for 1½ hours, a solution of 4½ grams sodium salt of m-nitrobenzene suflonic acid in 18 grams of water is added. The reaction is carried out under reflux for 2 hours, is diluted with water until a total volume of 2 liters is obtained, and 50 grams of glacial acetic acid is then added. Thereafter the mixture is stirred for 10 minutes, filtered, washed acid free, and dried. The yield is 6.6 grams of product. This material is acid recrystallized according to process of Example 2-D to yield 3.8 grams of a material which is identified as III.

In a modification of part A of Example 1, the reaction can be carried out in solvents other than Dowtherm such as methyl, or ethyl alcohol and under these conditions no vacuum is required.

Although in Example 1-A, ethyl p-aminobenzoate is used as the amine for the reaction, other alkyl p-aminobenzoates can be used wherein the alkyl is of 1–4 carbons, for example methyl p-aminobenzoate, propyl p-aminobenzoate, etc.

In Example 1 the preparation of I and Example 2 the preparation of IV is catalyzed by an acid. In Example 1 it is p-toluenesulfonic acid and in Example 2 it is hydrochloric acid. Other catalysts, such as trifluoroacetic acid in an anhydrous form, can be used with equal success.

Although in part B of Example 1 and in part A of Example 3, the cyclization reaction is carried out in the high boiling solvent Dowtherm, other high boiling solvents can be used with equal success. Solvents such as the dialkyl phthalates, e.g. diethyl phthalate, or tetramethylene sulfone will give the desired product.

PARTICLE SIZE REDUCTION

Examples 4 and 5 illustrate alternative methods for reducing the particle size of 2,9-dicarboxyquinacridone to suitable pigmentary dimensions.

EXAMPLE 4

This example illustrates particle size reduction of 2,9-dicarboxyquinacridone by salt milling.

Fifteen and six tenths grams of the product III obtained according to Example 1 is placed in a ball mill with 135.0 grams of $Al_2(SO_4)_3 \cdot 18H_2O$ and 2.4 grams of tetrachloroethylene and sufficient steel shot and roofing nails to half-fill the mill. The mill is rotated in the conventional manner at about 75% of critical speed for approximately 70 hours. The shot and nails are then separated from the pigment powder by screening and the powder product is added to 2,000 parts of water mixed with 80 parts $H_2SO_4$. The resulting slurry is heated to about 90°C., stirred for approximately one hour, filtered, washed, and dried in the conventional manner. The pigment is then pulverized.

EXAMPLE 5

This example illustrates particle-size reduction of 2,9-dicarboxyquinacridone by acetone milling.

Twelve grams of the product III obtained according to Example 1 is placed in a glass jar with 79 grams of acetone and 600 grams of steel shot of 0.125 inch diameter. After rotating the mill in the conventional manner for approximately 72 hours, the mill is discharged and the pigment is rinsed from the shot over a strainer by adding additional acetone. The resulting slurry in 2,000 parts of water is heated to about 90°C. to boil off the acetone, 36 parts of concentrated sulfuric acid is added, and the slurry is then boiled and stirred for 1.5 hours prior to filtering, and washing with water. The dried pigment is pulverized.

In Example 4 where the particle size reduction by salt milling the 2,9-dicarboxyquinacridone is shown, the salt is aluminum sulfate; however, other salts can be used with equal success. Salts such as sodium chloride, potassism chloride, hydrated aluminum sulfate, sodium sulfate and ammonium carbonate may be used.

Although in Example 5 the milling cycle was 70 hours, this milling time is not intended as limiting. Other milling cycles can be used and, in fact, milling cycles of 20 and 30 hours have been used to give products of even better dispersibility; however, with some sacrifice in strength.

Other methods of particle size reduction that may be employed are those employing high temperature acid drowning techniques or acid swelling techniques.

Utility of 2,9-dicarboxyquinacridone in Plastic Compositions

Pigmentary 2,9-dicarboxyquinacridone is an especially useful colorant in plastics, particularly those which require fabrication techniques carried out at high temperatures. The general procedure for evaluation of pigments as colorants in plastics is first to mix the dried pigment (together with extenders such as titanium dioxide, if desired) and the solid granular resin, and subject this mixture to vigorous stirring until homogeneity has been achieved. This blending operation may be carried out in any one of a wide variety of devices such as a ribbon blender, Banbury mixer, Baker-Perkins Mixer, or more simply by tumbling end-over-end in a closed container. The plastic pigment mixture is then injection-molded into chips at a temperature above the softening temperature of the plastic. For polystyrene, acetal resins, acrylic resins, polyester resins, and polyamides such as Zytel nylon resins, extrusion temperatures of from about 185°C. to about 320°C. are used. Examples 6 through 9 show the use of 2,9-dicarboxyquinacridone as a colorant in several plastic resins.

EXAMPLE 6

A mixture is prepared consisting of 5982 grams of a commercial acetal molding resin, 18 grams of pigmentary rutile titanium dioxide, and 0.30 gram of pigmentary 2,9-dicarboxyquinacridone. The mixture is first extruded at 185° to 195°C. into strands. Then the strands are cut into granules and molded into step chips at 200°C. The chips have a bright pink color which is superior in depth of color, cleanness of hue, and heat stability as compared with similarly prepared chips employing linear quinacridone as the colorant. The latter pigment undergoes a marked color change, i.e. to a yellow hue, when processed at the high temperatures.

EXAMPLE 7

A. Using the same procedure as given above in Example 6, the mixture of the following materials is fabricated into step chips:

6800 grams polymethylmethacrylate resin
    27.2 grams of rutile titanium dioxide
    3.0 grams 2,9-dicarboxyquinacridone pigment Both the compounding extrusion and the molding of the chips is carried out at 250°C. The chips are a bright, bluish-pink color of attractive depth of hue, cleanness, uniformity and heat stability.

B. Transparent chips are prepared using the same amounts of resin and colorant as in A, but omitting the titanium dioxide component. In this case, two sets of step chips are molded: one set at 250°C. and the other at 283°C. Both sets of chips are a translucent red and no difference in color between the two sets of chips can be observed.

EXAMPLE 8

In this example, pigmentary 2,9-dicarboxyquinacridone is used as a colorant for nylon resin.

Four thousand grams of nylon molding flake is tumbled with 20.0 grams of rutile titanium dioxide and 0.3 gram of pigmentary 2,9-dicarboxyquinacridone. The resulting mixture is compounded through an extruder at a temperature (barrel and die) of 270°C. The nylon strands from the extruder are cut into granules and molded into step chips at 270°C. The chips are of a clean bright pink color, definitely superior to similarly prepared nylon chips using 2,9-dimethylquinacridone as colorant. The latter undergo a marked color change to a yellower hue and exhibit intense fluorescence under ultraviolet light.

EXAMPLE 9

This example shows the excellent properties obtainable with the use of 2,9-dicarboxyquinacridone as a colorant for polystyrene extrusions.

One thousand grams of polystyrene powder are mixed with 1.0 gram pigmentary rutile titanium dioxide and 0.1 gram of pigmentary 2,9-dicarboxyquinacridone. The mixture is tumbled end-over-end in a closed container to obtain a uniform blend. The resultant colored powder is then injection molded into five sets of chips at 200°C., 230°C., 260°C., 290°C., and 320°C., respectively. The degree of degradation undergone by the pigment during the extruding operation is determined by comparing the colors of the chips processed at the above temperatures. The results are as follows:

|  | Rating at Extrusion Temperature | | | | |
| --- | --- | --- | --- | --- | --- |
|  | 200°C. | 230°C. | 260°C. | 290°C. | 320°C. |
| Product III as colorant | Bluish pink | 10 | 9 | 9 | 8 |
| Linear quinacridone (commercial grade) as colorant | Red | 5 | 3 | 1 | 0 |

The color changes at the four higher temperatures are to be compared with the color of the chip extruded at 200°C., a rating of 10 indicating complete color stability at the temperature indicated, 8 indicating slight change, 6 considerable change, 2 very bad degradation of color, and 0 indicating complete failure of the colorant. Under ultraviolet light, the chips pigmented with linear quinacridone exhibit marked fluorescence in contrast to the absence of fluorescence in chips pigmented with the product of this invention. It is considered that increased fluorescence is indicative of increased pigment solubility in the resin, which of course is undesirable.

What is claimed is:

1. A process for the preparation of 2,9-dicarboxyquinacridone of the chemical formula

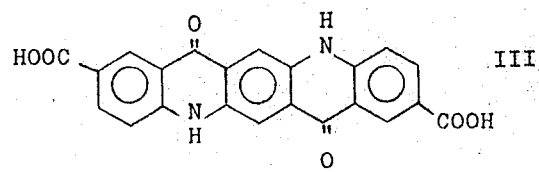

by the steps of
1. reacting dialkyl succinylsuccinate with p-aminobenzoic acid in a solvent at an elevated temperature under an inert atmosphere to yield dialkyl 2,5-di-(4-carboxyanilino)-3,6-dihydroterephthalate of chemical formula

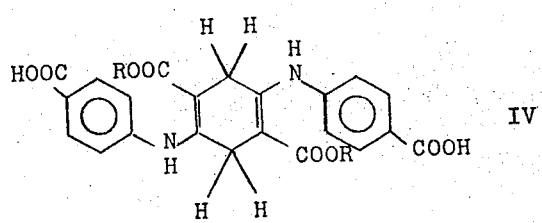

where R is alkyl of 1-4 carbons,
2. effecting the cyclization of IV in a high boiling solvent to yield 2,9-dicarboxy-(6,13-dihydroquinacridone) of chemical formula

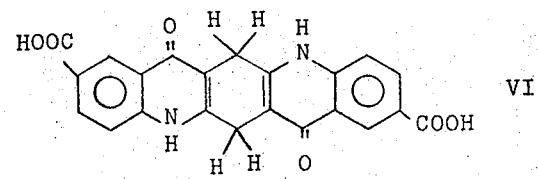

and
3. oxidizing VI in alcoholic NaOH in the presence of sodium m-nitrobenzene sulfonate to yield 2,9-dicarboxy-quinacridone III.

2. 2,9-dicarboxy-6,13-dihydroquinacridone of formula

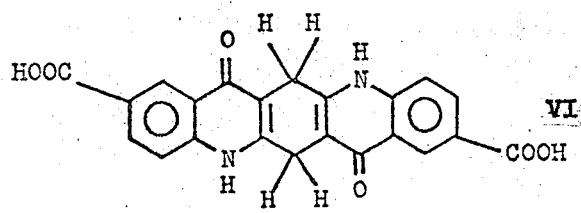

* * * * *